United States Patent
Tang et al.

(10) Patent No.: US 10,992,435 B2
(45) Date of Patent: Apr. 27, 2021

(54) INFORMATION INDICATION METHOD, DEVICE, AND SYSTEM

(71) Applicant: HUAWEI TECHNOLOGIES CO., LTD., Guangdong (CN)

(72) Inventors: Xiaoyong Tang, Shenzhen (CN); Jian Yu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/536,690

(22) Filed: Aug. 9, 2019

(65) Prior Publication Data

US 2019/0363852 A1 Nov. 28, 2019

Related U.S. Application Data

(63) Continuation of application No. PCT/CN2017/107717, filed on Oct. 25, 2017.

(30) Foreign Application Priority Data

Feb. 10, 2017 (CN) .......................... 201710074440.5

(51) Int. Cl.
*H04L 5/00* (2006.01)
*H04W 72/04* (2009.01)

(52) U.S. Cl.
CPC .......... *H04L 5/0048* (2013.01); *H04L 5/0007* (2013.01); *H04W 72/042* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 9,456,371 B2* | 9/2016 | Sorrentino | H04W 24/08 |
| 10,333,677 B2* | 6/2019 | Wang | H04L 5/0048 |
| 2014/0056265 A1* | 2/2014 | Koivisto | H04L 5/0025 |
| | | | 370/329 |

(Continued)

FOREIGN PATENT DOCUMENTS

| | | |
|---|---|---|
| EP | 2905935 A1 | 8/2015 |
| KR | 20160123873 A | 10/2016 |
| WO | 2011089993 A1 | 7/2011 |

OTHER PUBLICATIONS

Huawei, HiSilicon, Design of DL DMRS for data transmission. 3GPP TSG RAN WG1 Meeting #88 Athens, Greece, Feb. 13-17, 2017, R1-1701692, 5 pages.

(Continued)

*Primary Examiner* — Anh Vu H Ly
(74) *Attorney, Agent, or Firm* — Womble Bond Dickinson (US) LLP

(57) ABSTRACT

Embodiments of this application provide an information indication method, a device, and a system, to reduce pilot overheads caused by a reference signal. The method includes: determining, by a base station, that a port used to transmit a first reference signal and a port used to transmit a second reference signal are multiplexed; sending, by the base station, the first reference signal and/or the second reference signal on a multiplexed port; and generating, by the base station, information indicating multiplexing of the port, and sending the information indicating multiplexing.

20 Claims, 8 Drawing Sheets

(56) References Cited

U.S. PATENT DOCUMENTS

| | | | |
|---|---|---|---|
| 2014/0133395 A1* | 5/2014 | Nam | H04L 5/0023 |
| | | | 370/328 |
| 2015/0043466 A1* | 2/2015 | Yoshida | H04B 7/0632 |
| | | | 370/329 |
| 2015/0092695 A1* | 4/2015 | Zhao | H04W 24/00 |
| | | | 370/329 |
| 2016/0192338 A1* | 6/2016 | Benjebbour | H04B 7/0617 |
| | | | 370/330 |
| 2018/0076994 A1 | 3/2018 | Lee et al. | |
| 2018/0097534 A1* | 4/2018 | Manolakos | H04B 7/0632 |
| 2018/0115919 A1* | 4/2018 | Kakishima | H04B 7/0413 |
| 2018/0316471 A1* | 11/2018 | Li | H04L 5/005 |
| 2019/0260452 A1* | 8/2019 | Zhang | H04B 7/0695 |
| 2019/0334676 A1* | 10/2019 | Liu | H04L 5/0094 |

OTHER PUBLICATIONS

ZTE, ZTE Microelectronics, Discussion on RS for phase tracking. 3GPP TSG RAN WG1 Meeting #88 Athens, Greece Feb. 13-17, 2017, R1-1701817, 9 pages.

"Samsung et al, WF on CSI-RS for beam management. 3GPP TSG RAN WG1 Meeting #87Reno, USA, Nov. 14-18, 2016, R1-1613669, 5 pages".

Intel Corporation, "Remaining details on overhead reduction for Class B FD-MIMO", 3GPP TSG-RAN WG1 Meeting #87, R1-1611930, Reno, USA Nov. 14-18, 2016, total 4 pages.

* cited by examiner

INFORMATION INDICATION METHOD, DEVICE, AND SYSTEM

CROSS REFERENCE TO RELATED APPLICATIONS

This application is a continuation of International Application No. PCT/CN2017/107717, filed on Oct. 25, 2017, which claims priority to Chinese Patent Application No. 201710074440.5, filed on Feb. 10, 2017. The disclosures of the aforementioned applications are hereby incorporated by reference in their entireties.

TECHNICAL FIELD

This application relates to the field of wireless communications technologies, and in particular, to an information indication method, a device, and a system.

BACKGROUND

The 3rd Generation Partnership Project (3GPP) standard organization is currently formulating a next generation mobile communications system (next generation system) that is referred to as a 5th Generation (5G) mobile communications system.

In the 5G mobile communications system that is currently being formulated, to fully use spectrum resources, major corporations have reached consensus on supporting both low frequencies (frequencies less than 6 GHz) and high frequencies (frequencies greater than 6 GHz). Moreover, to improve spectral efficiency and cell coverage, a quantity of used antenna units also increases, and even may be 1024 at a high frequency. In addition, to support a larger quantity of layers in Multiple-Input Multiple-Output (MIMO) multiplexing, a quantity of ports used to transmit a reference signal also increases accordingly. For example, in the 3GPP Radio Access Network (RAN) 1 #86 meeting, major corporations have reached consensus on further researching Channel State Information-Reference Signal (CSI-RS) measurement supporting 32 or more ports and supporting at least eight Demodulation Reference Signal (DMRS) ports whose time-frequency locations are orthogonal to a time-frequency location of a CSI-RS port.

However, as a quantity of ports for a reference signal increases, pilot overheads caused by the reference signal also increase accordingly, and likely become a key factor that finally affects system performance. Therefore, how to reduce the pilot overheads caused by the reference signal becomes an urgent problem that currently needs to be resolved.

SUMMARY

Embodiments of this application provide an information indication method, a device, and a system, to reduce pilot overheads caused by a reference signal.

To achieve the foregoing objective, the following technical solutions are provided in the embodiments of this application.

According to a first aspect, an embodiment of this application provides an information indication method. The method includes: determining, by a base station, that a port used to transmit a first reference signal and a port used to transmit a second reference signal are multiplexed; sending, by the base station, the first reference signal and/or the second reference signal on a multiplexed port; and generating, by the base station, information indicating multiplexing of the port, and sending the information indicating multiplexing. Based on the information indication method provided in this embodiment of this application, in this embodiment of this application, because the port used to transmit the first reference signal and the port used to transmit the second reference signal may be multiplexed, the base station may send the first reference signal and/or the second reference signal on the multiplexed port. Therefore, some ports may be saved or data may be sent through saved ports, thereby reducing pilot overheads caused by a reference signal.

In one embodiment, the information indicating multiplexing includes: a first identifier, where the first identifier is used to indicate a multiplexing type of the port. A terminal device may learn of the multiplexing type of the port based on the first identifier.

In one embodiment, when the first identifier is set to a first value, it is identified that the port used to transmit the second reference signal is multiplexed, and the information indicating multiplexing further includes: a second identifier, where the second identifier is used to indicate a resource configuration index of the first reference signal; and a third identifier, where the third identifier is used to indicate an index of the port used to transmit the first reference signal. The terminal device may learn of a time-frequency resource of the first reference signal based on the second identifier and the third identifier.

In one embodiment, when the first identifier is set to a second value, it is identified that the port used to transmit the first reference signal is multiplexed, and the information indicating multiplexing further includes: a fourth identifier, where the fourth identifier is used to indicate a resource configuration index of the second reference signal; and a fifth identifier, where the fifth identifier is used to indicate an index of the port used to transmit the second reference signal. The terminal device may learn of a time-frequency resource of the second reference signal based on the fourth identifier and the fifth identifier.

In one embodiment, the information indicating multiplexing further includes: a sixth identifier, where the sixth identifier is used to indicate an index of a subframe in which the multiplexed port is located. The terminal device may learn of, based on the sixth identifier, a subframe in which a multiplexed port is located in a case of multiplexing crossing a plurality of subframes.

In one embodiment, the information indicating multiplexing further includes: a seventh identifier, where the seventh identifier is used to indicate an index of an orthogonal frequency division modulation (OFDM) symbol on which the multiplexed port is located. The terminal device may learn of, based on the seventh identifier, an OFDM symbol on which a multiplexed port is located in a case of multiplexing crossing a plurality of OFDM symbols.

In one embodiment, the information indicating multiplexing may further include an eighth identifier, where the eighth identifier is used to indicate whether a multiplexed port is used for data transmission. The terminal device may learn, based on the eighth identifier, whether the multiplexed port is used for data transmission. Then, if the multiplexed port is used for data transmission, data may be received on the multiplexed port.

In one embodiment, the sending, by the base station, the information indicating multiplexing may In one embodiment include: sending, by the base station, the information indicating multiplexing through a physical downlink dedicated control channel (PDCCH) or a physical downlink shared channel (PDSCH). Certainly, the base station may alternatively send the information indicating multiplexing in another manner. This is not specifically limited in this embodiment of this application.

According to a second aspect, an embodiment of this application provides an information indication method. The method includes: receiving, by a terminal device, information indicating multiplexing of a port used to transmit a first reference signal and a port used to transmit a second reference signal; and receiving, by the terminal device, the first reference signal and/or the second reference signal on a multiplexed port according to the information indicating multiplexing. Based on the information indication method provided in this embodiment of this application, in this embodiment of this application, because the port used to transmit the first reference signal and the port used to transmit the second reference signal may be multiplexed, the terminal device may receive the first reference signal and/or the second reference signal on the multiplexed port. Therefore, some ports may be saved or data may be sent through saved ports, thereby reducing pilot overheads caused by a reference signal.

In one embodiment, the information indicating multiplexing includes: a first identifier, where the first identifier is used to indicate a multiplexing type of the port. The terminal device may learn of the multiplexing type of the port based on the first identifier.

In one embodiment, when the first identifier is set to a first value, it is identified that the port used to transmit the second reference signal is multiplexed, and the information indicating multiplexing further includes: a second identifier, where the second identifier is used to indicate a resource configuration index of the first reference signal; and a third identifier, where the third identifier is used to indicate an index of the port used to transmit the first reference signal. The terminal device may learn of a time-frequency resource of the first reference signal based on the second identifier and the third identifier.

In one embodiment, when the first identifier is set to a second value, it is identified that the port used to transmit the first reference signal is multiplexed, and the information indicating multiplexing further includes: a fourth identifier, where the fourth identifier is used to indicate a resource configuration index of the second reference signal; and a fifth identifier, where the fifth identifier is used to indicate an index of the port used to transmit the second reference signal. The terminal device may learn of a time-frequency resource of the second reference signal based on the fourth identifier and the fifth identifier.

In one embodiment, the information indicating multiplexing further includes: a sixth identifier, where the sixth identifier is used to indicate an index of a subframe in which the multiplexed port is located. The terminal device may learn of, based on the sixth identifier, a subframe in which a multiplexed port is located in a case of multiplexing crossing a plurality of subframes.

In one embodiment, the information indicating multiplexing further includes: a seventh identifier, where the seventh identifier is used to indicate an index of an orthogonal frequency division modulation (OFDM) symbol on which the multiplexed port is located. The terminal device may learn of, based on the seventh identifier, an OFDM symbol on which a multiplexed port is located in a case of multiplexing crossing a plurality of OFDM symbols.

In one embodiment, the information indicating multiplexing may further include an eighth identifier, where the eighth identifier is used to indicate whether a multiplexed port is used for data transmission. The terminal device may learn, based on the eighth identifier, whether the multiplexed port is used for data transmission. Then, if the multiplexed port is used for data transmission, data may be received on the multiplexed port.

In one embodiment, the receiving, by a terminal device, information indicating multiplexing of a port used to transmit a first reference signal and a port used to transmit a second reference signal includes: receiving, by the terminal device, the information indicating multiplexing through a physical downlink dedicated control channel (PDCCH) or a physical downlink shared channel (PDSCH). Certainly, the terminal device may alternatively receive the information indicating multiplexing in another manner. This is not specifically limited in this embodiment of this application.

According to a third aspect, an embodiment of this application provides a base station, including: a processor, a memory, a bus, and a communications interface, where the memory is configured to store a computer executable instruction, the processor is connected to the memory by using the bus, and when the base station runs, the processor executes the computer executable instruction stored in the memory, to enable the base station to: determine that a port used to transmit a first reference signal and a port used to transmit a second reference signal are multiplexed; send the first reference signal and/or the second reference signal on a multiplexed port; and generate information indicating multiplexing of the port, and send the information indicating multiplexing.

In one embodiment, the information indicating multiplexing includes: a first identifier, where the first identifier is used to indicate a multiplexing type of the port.

In one embodiment, when the first identifier is set to a first value, it is identified that the port used to transmit the second reference signal is multiplexed, and the information indicating multiplexing further includes: a second identifier, where the second identifier is used to indicate a resource configuration index of the first reference signal; and a third identifier, where the third identifier is used to indicate an index of the port used to transmit the first reference signal.

In one embodiment, when the first identifier is set to a second value, it is identified that the port used to transmit the first reference signal is multiplexed, and the information indicating multiplexing further includes: a fourth identifier, where the fourth identifier is used to indicate a resource configuration index of the second reference signal; and a fifth identifier, where the fifth identifier is used to indicate an index of the port used to transmit the second reference signal.

In one embodiment, the information indicating multiplexing further includes: a sixth identifier, where the sixth identifier is used to indicate an index of a subframe in which the multiplexed port is located.

In one embodiment, the information indicating multiplexing further includes: a seventh identifier, where the seventh identifier is used to indicate an index of an orthogonal frequency division modulation (OFDM) symbol on which the multiplexed port is located.

In one embodiment, the information indicating multiplexing may further include an eighth identifier, where the eighth identifier is used to indicate whether a multiplexed port is used for data transmission.

In one embodiment, the sending the information indicating multiplexing may In one embodiment include: sending the information indicating multiplexing through a physical downlink dedicated control channel (PDCCH) or a physical downlink shared channel (PDSCH).

According to a fourth aspect, an embodiment of this application provides a computer readable storage medium, configured to store a computer software instruction used by the foregoing base station, where when the computer software instruction is run on a computer, the computer is enabled to perform the information indication method according to any one of the implementations of the first aspect.

According to a fifth aspect, an embodiment of this application provides a computer program product including an instruction, where when the instruction is run on a computer, the computer is enabled to perform the information indication method according to any one of the implementations of the first aspect.

For technical effects brought by any design manner in the third aspect to the fifth aspect, refer to the technical effects brought by the different design manners in the first aspect. Details are not described herein.

According to a sixth aspect, an embodiment of this application provides a terminal device, including: a processor, a memory, a bus, and a communications interface, where the memory is configured to store a computer executable instruction, the processor is connected to the memory by using the bus, and when the terminal device runs, the processor executes the computer executable instruction stored in the memory, to enable the terminal device to: receive information indicating multiplexing of a port used to transmit a first reference signal and a port used to transmit a second reference signal; and receive the first reference signal and/or the second reference signal on a multiplexed port according to the information indicating multiplexing.

In one embodiment, the information indicating multiplexing includes: a first identifier, where the first identifier is used to indicate a multiplexing type of the port.

In one embodiment, when the first identifier is set to a first value, it is identified that the port used to transmit the second reference signal is multiplexed, and the information indicating multiplexing further includes: a second identifier, where the second identifier is used to indicate a resource configuration index of the first reference signal; and a third identifier, where the third identifier is used to indicate an index of the port used to transmit the first reference signal.

In one embodiment, when the first identifier is set to a second value, it is identified that the port used to transmit the first reference signal is multiplexed, and the information indicating multiplexing further includes: a fourth identifier, where the fourth identifier is used to indicate a resource configuration index of the second reference signal; and a fifth identifier, where the fifth identifier is used to indicate an index of the port used to transmit the second reference signal.

In one embodiment, the information indicating multiplexing further includes: a sixth identifier, where the sixth identifier is used to indicate an index of a subframe in which the multiplexed port is located.

In one embodiment, the information indicating multiplexing further includes: a seventh identifier, where the seventh identifier is used to indicate an index of an orthogonal frequency division modulation (OFDM) symbol on which the multiplexed port is located.

In one embodiment, the information indicating multiplexing may further include an eighth identifier, where the eighth identifier is used to indicate whether a multiplexed port is used for data transmission.

In one embodiment, the receiving information indicating multiplexing of a port used to transmit a first reference signal and a port used to transmit a second reference signal includes: receiving the information indicating multiplexing through a physical downlink dedicated control channel (PDCCH) or a physical downlink shared channel (PDSCH).

According to a seventh aspect, an embodiment of this application provides a computer readable storage medium, configured to store a computer software instruction used by the foregoing terminal device, where when the computer software instruction is run on a computer, the computer is enabled to perform the information indication method according to any one of the implementations of the second aspect.

According to an eighth aspect, an embodiment of this application provides a computer program product including an instruction, where when the instruction is run on a computer, the computer is enabled to perform the information indication method according to any one of the implementations of the second aspect.

For technical effects brought by any design manner in the sixth aspect to the eighth aspect, refer to the technical effects brought by the different design manners in the second aspect. Details are not described herein.

According to a ninth aspect, an embodiment of this application provides a communications system. The communications system includes the base station according to any one of the implementations of the foregoing aspects and at least one terminal device according to any one of the implementations of the foregoing aspects.

These aspects or other aspects of this application are clearer and more comprehensible in descriptions of the following embodiments.

BRIEF DESCRIPTION OF DRAWINGS

FIG. 4-1 is a first schematic diagram of multiplexing a CSI-RS port and a DMRS port according to an embodiment of this application;

FIG. 4-2 is a second schematic diagram of multiplexing a CSI-RS port and a DMRS port according to an embodiment of this application;

DESCRIPTION OF EMBODIMENTS

The following describes the technical solutions in the embodiments of this application with reference to the accompanying drawings in the embodiments of this application.

First, to make descriptions of the following embodiments clear and concise, related technologies are briefly described below.

In an existing Long Term Evolution (LTE) or Long Term Evolution Advanced (LTE-A) system, an Orthogonal Frequency Division Multiple Access (OFDMA) manner is usually used as a downlink multiple access manner. A downlink resource of the system is divided into Orthogonal Frequency Division Multiplexing (OFDM) symbols from the perspective of time, and is divided into subcarriers from the perspective of frequency. Based on an LTE standard, one radio frame includes 10 subframes, the length of one subframe is 1 ms, and subframes of each radio frame are numbered from 0 to 9. One subframe includes two slots (slot), and in a normal Cyclic Prefix (CP) case, each slot includes seven OFDM symbols numbered from 0 to 6; and in an extended CP case, each slot includes six OFDM symbols numbered from 0 to 5. A time-frequency resource including one OFDM symbol and one subcarrier is referred to as a Resource Element (RE). In each of the following examples in the embodiments of this application, description is made by using a frame structure of the LTE or LTE-A system in a normal CP as an example, uniform description is made herein, and details are not described below again.

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, "a plurality of" means two or more than two.

Figure 1:
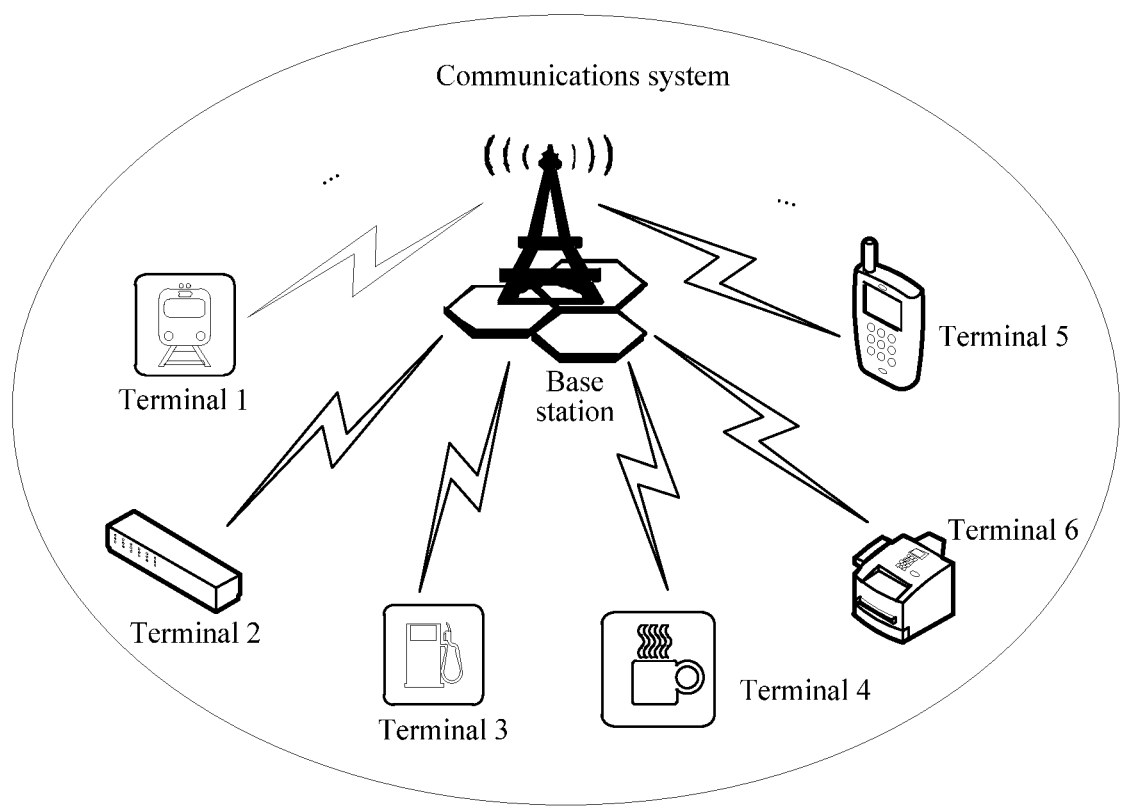
FIG. 1 is a schematic infrastructural diagram of a communications system according to an embodiment of this application.

FIG. 1 is a schematic infrastructural diagram of a communications system according to an embodiment of this application. As shown in FIG. 1, the communications system includes a base station, and a plurality of terminal devices within a cell managed by the base station. The base station is an apparatus that is configured to provide a wireless communication function and that is deployed in a radio access network; and the terminal device is mainly configured to receive or send service data and pilot. The base station may communicate with each of the plurality of terminal devices.

It should be noted that, the foregoing communications system may be applied to the current LTE or LTE-A system, or may be applied to a 5G network that is currently being formulated or another future network. This is not specifically limited in this embodiment of this application. In different networks, the base station and the terminal device in the foregoing communications system may correspond to different names. A person skilled in the art may understand that, a name does not limit a device. For example, in the 5G network and the another future network, the base station may be further referred to as a New Radio NodeB (gNB), and the terminal device may be further referred to as user equipment. This is not specifically limited in this embodiment of this application. Additionally, a frame structure in the 5G network or the another future network may be different from a frame structure of the LTE or LTE-A system. In this embodiment of this application, description is made by using only the frame structure of the LTE or LTE-A system as an example, and the frame structure in the 5G network or the another future network is not specifically limited.

It should be noted that, the foregoing communications system may be applied to a high-frequency system, or may be applied to a low-frequency system. This is not specifically limited in this embodiment of this application. In the high-frequency system, both the base station and the terminal device need to receive or send service data and pilot by using a directive analog beam, to obtain a relatively high beamforming gain. For details, refer to an existing 3GPP communications standard. Details are not described herein.

Figure 2:
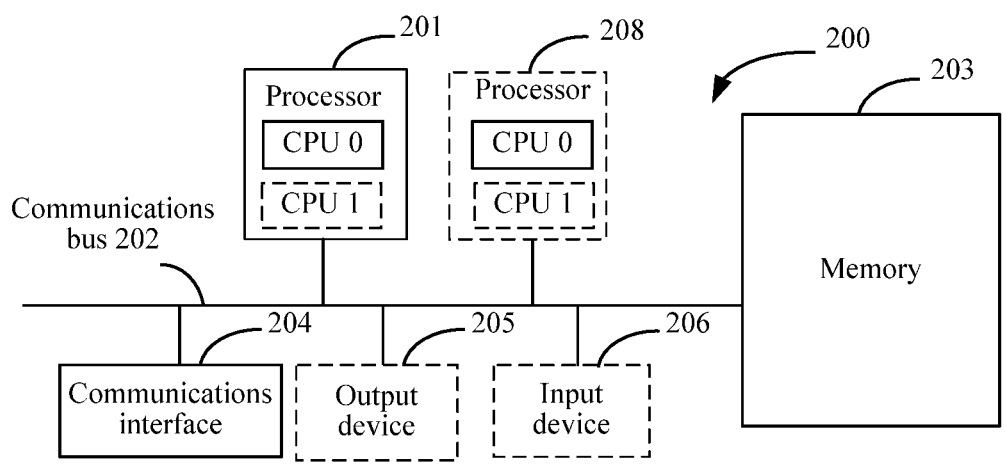
FIG. 2 is a schematic diagram of a hardware structure of a communications device according to an embodiment of this application.

In one embodiment, the base station and the terminal device in the communications system shown in FIG. 1 may be implemented through a communications device (or system) in FIG. 2.

FIG. 2 is a schematic diagram of a hardware structure of a communications device according to an embodiment of this application. The communications device includes at least one processor 201, a communications bus 202, a memory 203, and at least one communications interface 204.

The processor 201 may be a general-purpose Central Processing Unit (CPU), a microprocessor, an Application-Specific Integrated Circuit (ASIC), or one or more integrated circuits that are configured to control execution of a program in a solution of this application.

The communications bus 202 may include a path for transferring information between the foregoing components.

The communications interface 204 uses any apparatus of a transceiver type, to communicate with another device or a communications network, such as the Ethernet, a Radio Access Network (RAN), or a Wireless Local Area Network (WLAN).

The memory 203 may be a Read-Only Memory (ROM), another type of static storage device that can store static information and instructions, a Random Access Memory (RAM), or another type of dynamic storage device that can store information and instructions; or may be an Electrically Erasable Programmable Read-Only Memory (EEPROM), a Compact Disc Read-Only Memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. This does not constitute a limitation herein. The memory may exist independently and is connected to the processor by using the bus. The memory may also be integrated with the processor.

The memory 203 is configured to store application program code for performing the solutions of this application, and execution of the application program code is controlled by the processor 201. The processor 201 is configured to execute the application program code stored in the memory 203, thereby implementing an information indication method in an embodiment of this application.

In a specific implementation, in an embodiment, the processor 201 may include one or more CPUs, for example, a CPU 0 and a CPU 1 in FIG. 2.

In a specific implementation, in an embodiment, the communications device 200 may include a plurality of processors such as the processor 201 and a processor 208 in FIG. 2. Each of these processors may be a single-core (single-core) processor, or may be a multi-core (multi-core) processor. The processor herein may be one or more devices or circuits, and/or a processing core configured to process data (for example, a computer program instruction).

In a specific implementation, in an embodiment, the communications device 200 may further include an output device 205 and an input device 206. The output device 205 communicates with the processor 201, and may display information in various manners. For example, the output device 205 may be a Liquid Crystal Display (LCD), a Light Emitting Diode (LED) display device, a Cathode Ray Tube (CRT) display device, a projector (projector), or the like. The input device 206 communicates with the processor 201, and may receive an input of a user in various manners. For example, the input device 206 may be a mouse, a keyboard, a touchscreen device, a sensing device, or the like.

The communications device 200 may be a general-purpose communications device or a dedicated communications device. In a specific implementation, the communications device 200 may be a desktop computer, a portable computer, a network server, a Personal Digital Assistant (PDA), a mobile phone, a tablet computer, a wireless terminal device, an embedded device, or a device having a structure similar to that in FIG. 2. A type of the communications device 200 is not limited in this embodiment of this application.

Figure 3:
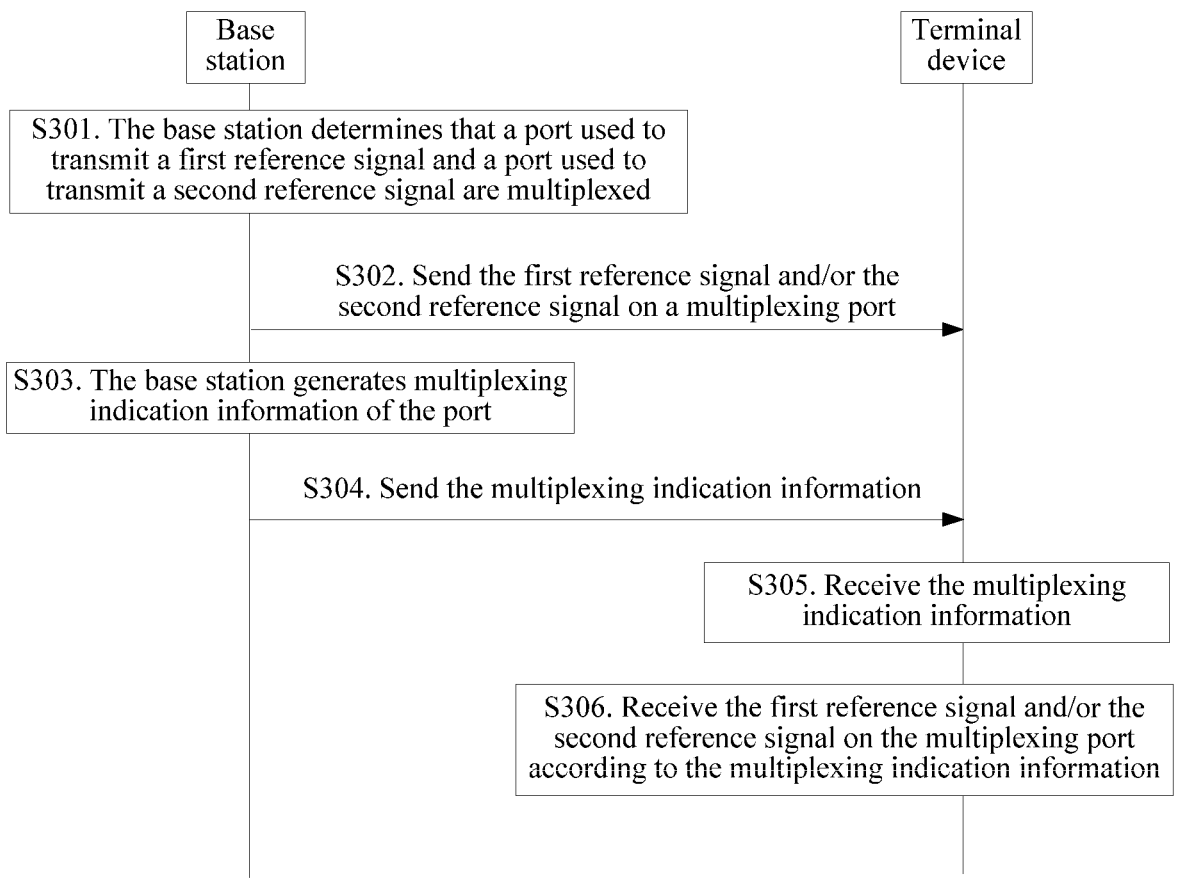
FIG. 3 is a schematic flowchart of an information indication method according to an embodiment of this application.

FIG. 3 shows an information indication method according to an embodiment of this application, and the information indication method is described by using interaction between a base station and any terminal device as an example, and includes the following operations.

Operation S301. The base station determines that a port used to transmit a first reference signal and a port used to transmit a second reference signal are multiplexed.

Operation S302. The base station sends the first reference signal and/or the second reference signal on a multiplexed port.

Operation S303. The base station generates information indicating multiplexing of the port.

Operation S304. The base station sends the information indicating multiplexing to the terminal device.

Operation S305. The terminal device receives the information indicating multiplexing sent by the base station.

Operation S306. The terminal device receives the first reference signal and/or the second reference signal on the multiplexed port according to the information indicating multiplexing.

It should be noted that, in the embodiment shown in FIG. 3, an order of performing operations S302 and S304 is not limited. For example, operation S302 may be first performed, and then operation S304 is performed; operation S304 may be first performed, and then operation S302 is performed; or evidently, operations S302 and S304 may be performed at the same time.

A "port" in this embodiment of this application is not a physical antenna port, but information about a time-frequency location of a reference signal on an OFDM symbol, uniform description is made herein, and details are not described below again.

For example, the first reference signal and the second reference signal in this embodiment of this application may be a DMRS signal and a CSI-RS signal respectively; may be a DMRS signal and another reference signal respectively; or may be a CSI-RS signal and another reference signal respectively. This is not specifically limited in this embodiment of this application. The another reference signal herein may be, for example, a Phase Tracking Reference Signal (PTRS).

Description is made below by using an example in which a CSI-RS and a DMRS are multiplexed.

If the first reference signal is a CSI-RS, and the second reference signal is a DMRS, the port used to transmit the first reference signal may be a CSI-RS port, and the port used to transmit the second reference signal may be a DMRS port. Therefore, after determining that the CSI-RS port and the DMRS port are multiplexed, the base station may generate information indicating multiplexing of a port, send the information indicating multiplexing, and send the CSI-RS and/or the DMRS on the multiplexed port. After receiving the information indicating multiplexing, the terminal device may receive the CSI-RS and/or the DMRS on the multiplexed port according to the information indicating multiplexing. The DMRS is used for data demodulation, and the CSI-RS is used for channel measurement. For details, refer to functions of the DMRS and the CSI-RS. Details are not described herein.

Figures 1, 4:
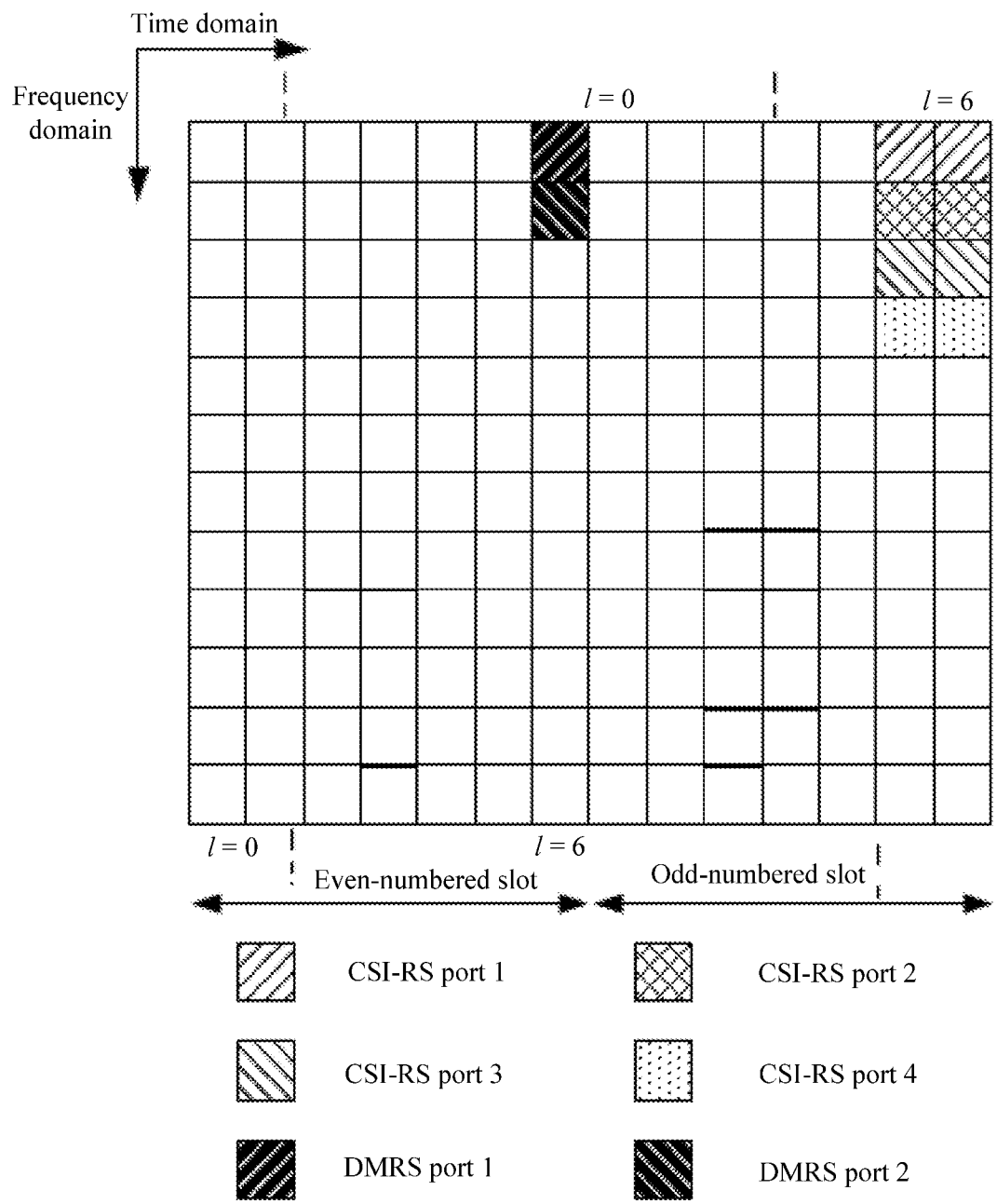
Figures 2, 4:
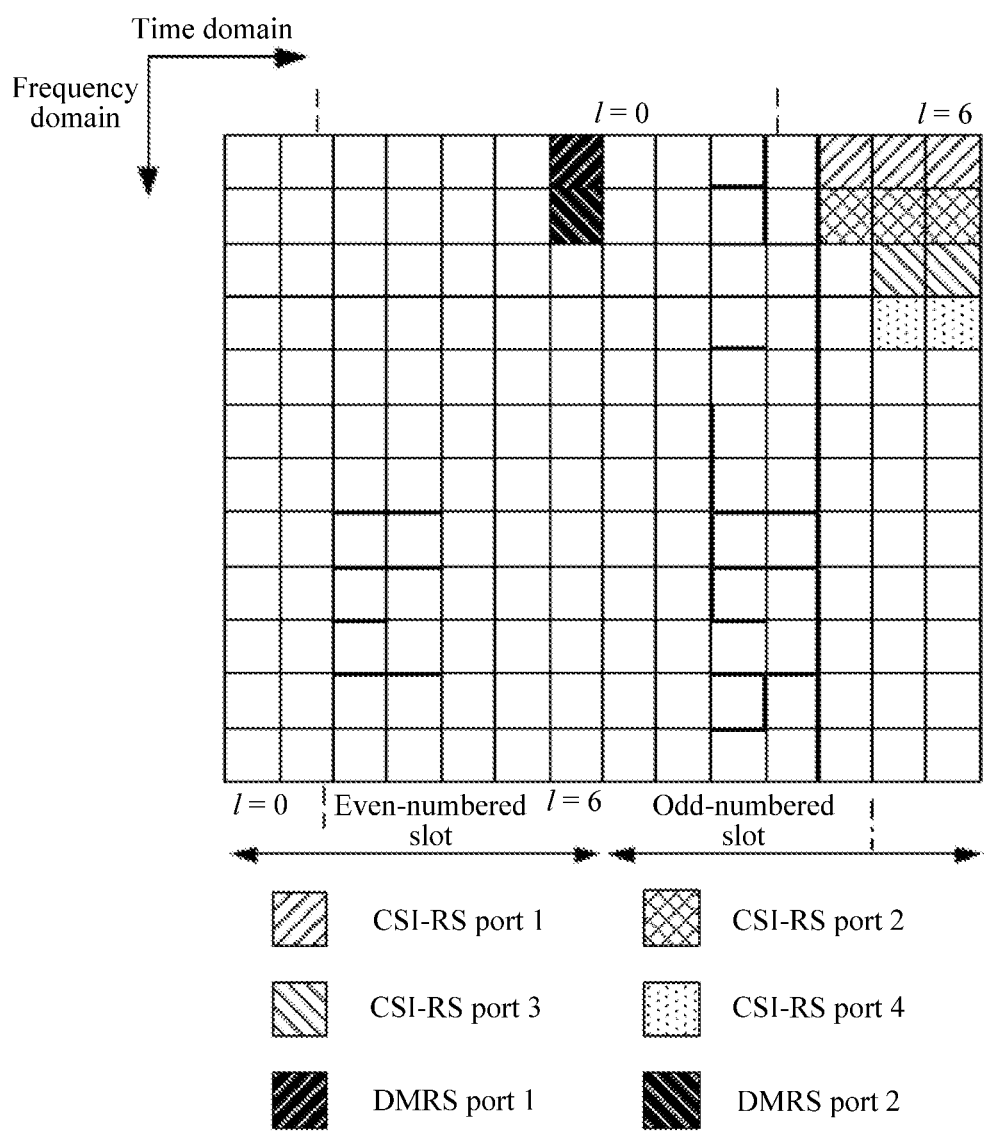

For example, during CSI-RS channel measurement, a plurality of analog beams may be mapped to a plurality of antenna ports on one OFDM symbol or mapped to a plurality of antenna ports on a plurality of OFDM symbols. Using an example of measuring N beams (beam), assuming that a quantity of available antenna ports on each OFDM symbol is K, and different beams need to correspond to different CSI-RS ports, in the prior art, ⌈N/K⌉ OFDM symbols are required to measure the N beams, where ⌈ ⌉ indicates rounding up. Assuming that N=10, and K=4, CSI-RS channel measurement needs to be performed by specially using three OFDM symbols. If the information indication method provided in this embodiment of this application is used, an example in which the DMRS port is multiplexed for the CSI-RS port is used, that is, an example in which a multiplexed port is the DMRS port is used, as shown in FIG. 4-1, a frequency division multiplexing method is used, two CSI-RS ports may be saved by multiplexing two DMRS ports, then CSI-RS channel measurement needs to be specially performed through only two last OFDM symbols, and a DMRS resource on the sixth OFDM symbol located in an even-numbered slot not only may be used to perform DMRS data demodulation, but also may be used to perform CSI-RS channel measurement. The saved CSI-RS ports may be used to send data or used for channel measurement or data demodulation of another beam. This is not specifically limited in this embodiment of this application. It should be noted that, in FIG. 4-1, schematic description is made by using an example in which the two last OFDM symbols are specially used for CSI-RS channel measurement. Certainly, an OFDM symbol specially used for CSI-RS channel measurement may alternatively be at another location. This is not specifically limited in this embodiment of this application. Additionally, in FIG. 4-1, schematic description is made by using an example in which one antenna port corresponds to one RE. Certainly, one antenna port is not limited to corresponding to one RE, and may correspond to a plurality of REs. This is not specifically limited in this embodiment of this application. It should be noted that, in a frame structure in FIG. 4-1, a configuration of only a multiplexed port is provided, and a configuration of a multiplexed port is not provided. Certainly, a frame structure may alternatively include a configuration of a multiplexed port. For example, FIG. 4-2 provides a configuration of a multiplexed port, and schematic description is made by using an example in which the multiplexed port is a CSI-RS resource on the fourth OFDM symbol in an odd-numbered slot. Whether a frame structure includes a configuration of a multiplexed port is not specifically limited in this embodiment of this application. Similarly, during DMRS data demodulation, a CSI-RS port may alternatively be multiplexed for a DMRS port, thereby saving a DMRS port. The saved DMRS port may be used to send data or used for data demodulation or channel measurement of another beam. In this embodiment of this application, details are not described herein. For details, refer to the foregoing example.

In one embodiment, of this application, a premise of multiplexing the port used to transmit the first reference signal and the port used to transmit the second reference signal is: A same analog beam is used for the port used to transmit the first reference signal and the port used to transmit the second reference signal, and the port used to transmit the first reference signal and the port used to transmit the second reference signal are precoded without using an additional analog beam other than the analog beam or are precoded by using the same analog beam.

For example, description is made still by using an example in which a CSI-RS and a DMRS are multiplexed.

Figure 5:
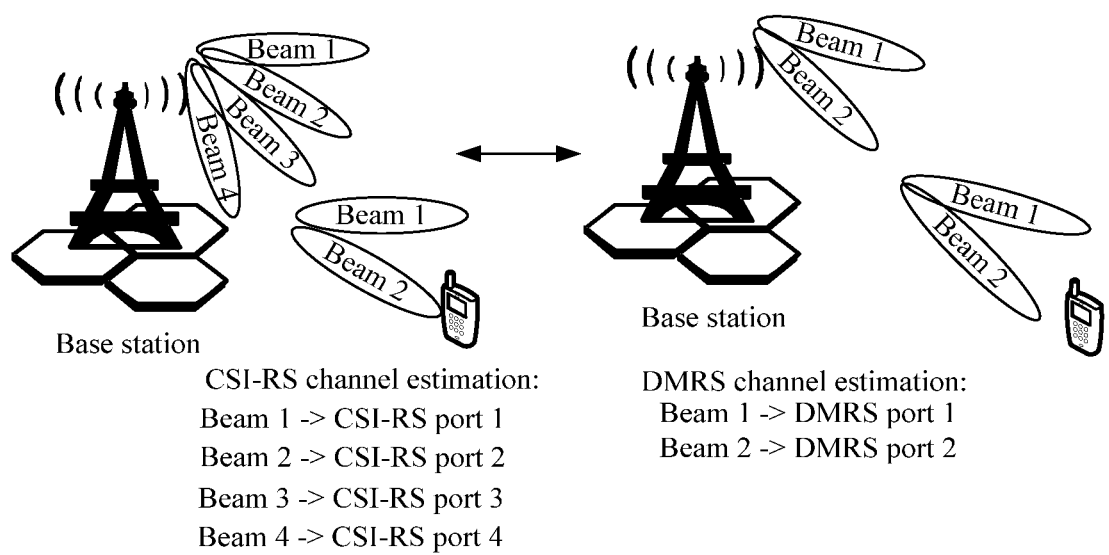
FIG. 5 is a schematic diagram of transmitting a CSI-RS and a DMRS based on a plurality of analog beams according to an embodiment of this application.

As shown in FIG. 5, during CSI-RS channel measurement, four beams respectively correspond to four CSI-RS ports; and during DMRS data demodulation, two beams respectively correspond to two DMRS ports. If Space Frequency Block Coding (SFBC) transmission is performed by using a beam 1 and a beam 2, because the CSI-RS port and the DMRS port are not precoded in SFBC, multiplexing may be performed between CSI-RS ports 1 and 2 and the DMRS ports 1 and 2. Multiplexing types of the ports include at least the following two types:

First type: A DMRS port is multiplexed for a CSI-RS port. To be specific, both CSI-RS channel measurement and DMRS data demodulation of the beam 1 and the beam 2 may be completed by the DMRS port, and the idle CSI-RS port may be used to measure another beam or used for data transmission.

Second type: A CSI-RS port is multiplexed for a DMRS port. To be specific, both CSI-RS channel measurement and DMRS data demodulation of the beam 1 and the beam 2 may be completed by the CSI-RS port, and the idle DMRS port may be used to measure another beam or used for data transmission.

Based on the information indication method provided in this embodiment of this application, in this embodiment of this application, because the port used to transmit the first reference signal and the port used to transmit the second reference signal may be multiplexed, the base station may send the first reference signal and/or the second reference signal on the multiplexed port. Therefore, some ports may be saved or data may be sent through saved ports, thereby reducing pilot overheads caused by a reference signal.

Actions of the base station in the foregoing operations S301 to S304 may be performed by the processor 201 in the communications device 200 shown in FIG. 2 by invoking the application program code stored in the memory 203. This is not limited in this embodiment of this application.

Actions of the terminal device in the foregoing operations S305 and S306 may be performed by the processor 201 in the communications device 200 shown in FIG. 2 by invoking the application program code stored in the memory 203. This is not limited in this embodiment of this application.

In one embodiment, the information indicating multiplexing in the embodiment shown in FIG. 3 may specifically include: a first identifier, where the first identifier is used to indicate a multiplexing type of the port.

When the first identifier is set to a first value, it is identified that the port used to transmit the second reference signal is multiplexed; when the first identifier is set to a second value, it is identified that the port used to transmit the first reference signal is multiplexed; and when the first identifier is set to a third value, it is identified that the port used to transmit the first reference signal and the port used to transmit the second reference signal cannot be multiplexed.

For example, the first identifier may be indicated by using 2 bits, and the 2 bits correspond to four values in total, namely, "00", "01", "10", and "11". The first value, the second value, and the third value may be any three different values of "00", "01", "10", and "11". For example, the first value is "01", the second value is "10", and the third value is "00". This is not specifically limited in this embodiment of this application.

Alternatively, the first identifier may be indicated by using 2 bits. In the first bit of the 2 bits, "1" identifies that the port used to transmit the first reference signal and the port used to transmit the second reference signal may be multiplexed, and "0" identifies that the port used to transmit the first reference signal and the port used to transmit the second reference signal cannot be multiplexed; and "1" in the second bit identifies that the port used to transmit the second reference signal is multiplexed, and "0" in the second bit indicates that the port used to transmit the first reference signal is multiplexed. In this case, the first value is "11", the second value is "10", and the third value is "00" or "01".

Alternatively, the first identifier may be further indicated by using 1 bit, and the 1 bit corresponds to two values in total, namely, "0" and "1". The first value and the second value respectively correspond to "0" and "1". For example, the first value is "1", and the second value is "0"; or the first value is "0", and the second value is "1". This is not specifically limited in this embodiment of this application.

The foregoing provides only an example of several possible representation forms of the first identifier. Certainly, the first identifier may further have another representation form. A specific form and a value of the first identifier are not specifically limited in this embodiment of this application.

The terminal device may learn of the multiplexing type of the port based on the first identifier.

In one embodiment, when the first identifier is set to a first value, the information indicating multiplexing in the embodiment shown in FIG. 3 may further include: a second identifier and a third identifier, where the second identifier is used to indicate a resource configuration index of the first reference signal, and the third identifier is used to indicate an index of the port used to transmit the first reference signal.

In this way, after receiving the information indicating multiplexing, the terminal device may determine a time-frequency resource of the first reference signal based on the second identifier and the third identifier in the information indicating multiplexing. For example, in FIG. 4-1, assuming that an index of a CSI-RS resource located on the fifth OFDM symbol in an odd-numbered slot is a CSI-RS resource 1, and an index of a CSI-RS resource located on the sixth OFDM symbol in the odd-numbered slot is a CSI-RS resource 2, if the second identifier indicates that a resource configuration index of the CSI-RS is the CSI-RS resource 2, and the third identifier indicates that a port index of the CSI-RS is the CSI-RS port 1, the terminal device may determine that a time-frequency resource of the CSI-RS is the first RE located on the sixth OFDM symbol in the odd-numbered slot.

Certainly, the information indicating multiplexing may alternatively not include the second identifier and the third identifier, but another signaling or message sent by the base station to the terminal device carries the second identifier and the third identifier. This is not specifically limited in this embodiment of this application. For example, the base station may send first signaling and second signaling to the terminal device, the first signaling carries the information indicating multiplexing, and the second signaling carries the second identifier and the third identifier.

The terminal device may obtain the time-frequency resource of the first reference signal based on the second identifier and the third identifier.

In one embodiment, when the first identifier is set to a second value, the information indicating multiplexing in the embodiment shown in FIG. 3 may further include: a fourth identifier and a fifth identifier, where the fourth identifier is used to indicate a resource configuration index of the second reference signal, and the fifth identifier is used to indicate an index of the port used to transmit the second reference signal.

In this way, after receiving the information indicating multiplexing, the terminal device may determine a time-frequency resource of the second reference signal based on the fourth identifier and the fifth identifier in the information indicating multiplexing. For example, in FIG. 4-1, assuming that an index of a CSI-RS resource located on the fifth OFDM symbol in an odd-numbered slot is a CSI-RS resource 1, and an index of a CSI-RS resource located on the sixth OFDM symbol in the odd-numbered slot is a CSI-RS resource 2, if the fourth identifier indicates that a resource configuration index of the CSI-RS is the CSI-RS resource 2, and the fifth identifier indicates that a port index of the CSI-RS is the CSI-RS port 1, the terminal device may determine that a time-frequency resource of the CSI-RS is the first RE located on the sixth OFDM symbol in the odd-numbered slot.

Certainly, the information indicating multiplexing may alternatively not include the fourth identifier and the fifth identifier, but another signaling or message sent by the base station to the terminal device carries the fourth identifier and the fifth identifier. This is not specifically limited in this embodiment of this application. For example, the base station may send first signaling and third signaling to the terminal device, the first signaling carries the information indicating multiplexing, and the third signaling carries the fourth identifier and the fifth identifier.

The terminal device may obtain the time-frequency resource of the second reference signal based on the fourth identifier and the fifth identifier.

In one embodiment, when the first identifier is set to a first value, the information indicating multiplexing in the embodiment shown in FIG. 3 may further include the fourth identifier and the fifth identifier. In this way, after receiving the information indicating multiplexing, the terminal device may determine the time-frequency resource of the second reference signal based on the fourth identifier and the fifth identifier in the information indicating multiplexing, and then receive data on the time-frequency resource of the second reference signal. This is not specifically limited in this embodiment of this application. For details, refer to a manner of determining the time-frequency resource of the first reference signal when the first identifier is set to a first value. Details are not described herein.

In one embodiment, when the first identifier is set to a second value, the information indicating multiplexing in the embodiment shown in FIG. 3 may further include the second identifier and the third identifier. In this way, after receiving the information indicating multiplexing, the terminal device may determine the time-frequency resource of the first reference signal based on the second identifier and the third identifier in the information indicating multiplexing, and then receive data on the time-frequency resource of the first reference signal. This is not specifically limited in this embodiment of this application. For details, refer to a manner of determining the time-frequency resource of the second reference signal when the first identifier is set to a second value. Details are not described herein.

Further, in consideration of impact of a time-varying characteristic of a channel on multiplexing performance of the port used to transmit the first reference signal and the port used to transmit the second reference signal, it should be ensured as much as possible that a multiplexing time interval is within a coherence time, for example, within a slot or a subframe. If the channel is changed relatively slowly, multiplexing crossing a plurality of subframes or a plurality of slots is not excluded. This is not specifically limited in this embodiment of this application. Therefore, In one embodiment, the information indicating multiplexing in the embodiment shown in FIG. 3 may further include: a sixth identifier, where the sixth identifier is used to indicate an index of a subframe in which the multiplexed port is located; and/or, In one embodiment, the information indicating multiplexing in the embodiment shown in FIG. 3 may further include: a seventh identifier, where the seventh identifier is used to indicate an index of an OFDM symbol on which the multiplexed port is located.

In one embodiment, the sixth identifier may be an index of a subframe, or may be an offset of a subframe. This is not specifically limited in this embodiment of this application. Using an example in which the sixth identifier is an offset of a subframe, assuming that a subframe in which a multiplexed port is located is an $N^{th}$ subframe, and an offset of the subframe is $\Delta$, a subframe in which a multiplexed port is located is an $(N+\Delta)^{th}$ subframe. For example, in FIG. 6, assuming that a DMRS port in a subframe 4 is to be multiplexed for a CSI-RS port in a subframe 2, a subframe in which a multiplexed port is located is the subframe 2, and an offset A of the subframe is equal to 2. Therefore, a subframe in which a multiplexed port is located is the subframe 4.

In one embodiment, an index of an OFDM symbol may be an index number in an entire subframe, or may be a relative index number within a resource of the second reference signal. For example, if one CSI-RS resource occupies two OFDM symbols, the first OFDM symbol or the second OFDM symbol may be indicated by using 1 bit. This is not specifically limited in this embodiment of this application.

Figure 6:
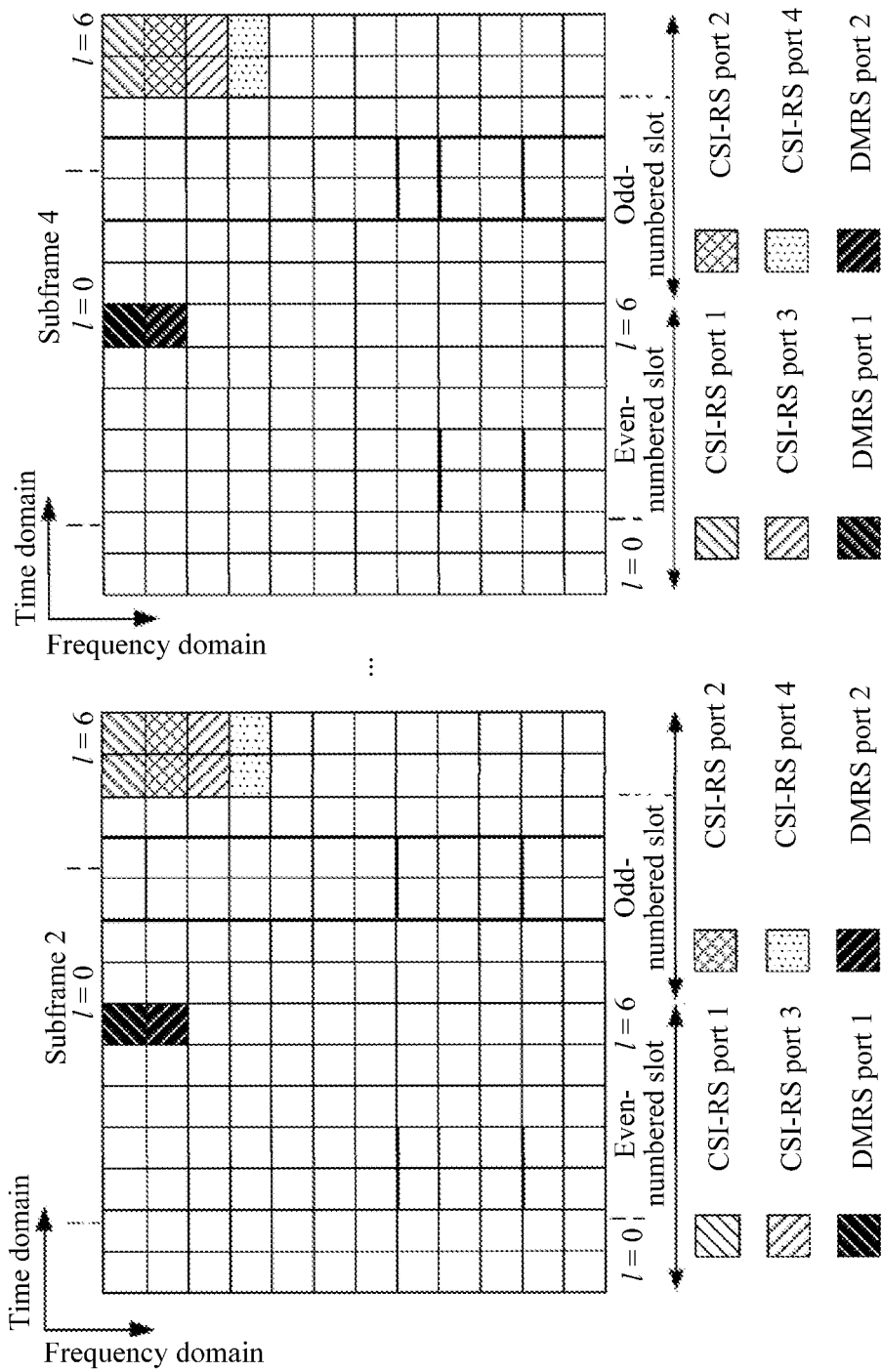
FIG. 6 is a third schematic diagram of multiplexing a CSI-RS port and a DMRS port according to an embodiment of this application.

For example, in the subframe 4 in FIG. 6, assuming that one CSI-RS resource corresponds to eight REs and occupies two OFDM symbols, the first OFDM symbol may be indicated by using "0" in the 1 bit, and the second OFDM symbol may be indicated by using "1" in the 1 bit; or an index of an OFDM symbol may be indicated by using (k, l), a slot index may be indicated by using k, and an OFDM symbol index may be indicated by using l. For example, the first OFDM symbol is indicated by using (1, 5), and the second OFDM symbol is indicated by using (1, 6).

The terminal device may learn of, based on the sixth identifier, a subframe in which a multiplexed port is located in a case of multiplexing crossing a plurality of subframes.

The terminal device may learn of, based on the seventh identifier, an OFDM symbol on which a multiplexed port is located in a case of multiplexing crossing a plurality of OFDM symbols.

In one embodiment, the information indicating multiplexing in the embodiment shown in FIG. 3 may further include:

an eighth identifier, where the eighth identifier is used to indicate whether the multiplexed port is used for data transmission.

For example, the eighth identifier may be indicated by using 1 bit. For example, "1" is used to identify that the multiplexed port is used for data transmission; and "0" is used to identify that the multiplexed port is not used for data transmission.

Certainly, the eighth identifier may further indicate whether the multiplexed port is used to transmit another reference signal. This is not specifically limited in this embodiment of this application.

The terminal device may learn, based on the eighth identifier, whether the multiplexed port is used for data transmission. Then, if the multiplexed port is used for data transmission, data may be received on the multiplexed port.

In one embodiment, operation S304 in the embodiment shown in FIG. 3 may specifically include: sending the information indicating multiplexing through a Physical Downlink Dedicated Control Channel (PDCCH). Correspondingly, operation S305 in the embodiment shown in FIG. 3 may in one embodiment include: receiving the information indicating multiplexing through a PDCCH.

In one embodiment, the information indicating multiplexing may be carried in Downlink Control Information (DCI) of the PDCCH. For example, a information indicating multiplexing field is newly added to a DCI format.

In one embodiment, operation S304 in the embodiment shown in FIG. 3 may specifically include: sending the information indicating multiplexing through a Physical Downlink Shared Channel (PDSCH). Correspondingly, operation S305 in the embodiment shown in FIG. 3 may in one embodiment include: receiving the information indicating multiplexing through a PDSCH.

In one embodiment, the information indicating multiplexing may be carried in Media Access Control (MAC) Control Element (CE) signaling of the PDSCH. The MAC CE signaling may be a type newly added based on existing LTE, and is identified through a Logical Channel Identity (LCID). For example, the type of the MAC CE signaling in the existing LTE is shown in Table 1:

TABLE 1

| Index (Index) | Direction (Direction) | MAC CE type |
| --- | --- | --- |
| 11010 | Up Link (UL) | Power Headroom Reporting (PHR) |
| 11011 | UL | Cell Radio Network Temporary Identifier (C-RNTI) |
| 11100 | UL | Truncated (Truncated) Buffer Status Report (BSR) |
| 11101 | UL | Short (Short) BSR |
| 11110 | UL | Long (Long) BSR |
| 11100 | Down Link (DL) | Terminal device Contention Resolution Identity (CRI) |
| 11101 | DL | Timing Advance Command (Timing Advance Command) |
| 11110 | DL | Discontinuous Reception (DRX) command |

An index (Index) represents an LCID. To implement the MAC CE signaling in this embodiment of this application, an index may be newly added to indicate the information indicating multiplexing. For example, "10111" identifies the information indicating multiplexing.

The foregoing describes the solutions provided in the embodiments of this application mainly from a perspective of interaction between the base station and the terminal device. It may be understood that to implement the foregoing functions, the foregoing terminal and terminal device include corresponding hardware structures and/or software modules for performing the functions. A person skilled in the art should be easily aware that units and algorithm operations in the examples described with reference to the embodiments provided in this specification may be implemented in a form of hardware or in a form of a combination of hardware and computer software in this application. Whether a function is implemented by hardware or in a manner of driving hardware by a computer software depends on a particular application and a design constraint condition of the technical solution. A person skilled in the art may use different methods to implement the described functions for each particular application, but it should not be considered that the implementation goes beyond the scope of this application.

Figure 7:
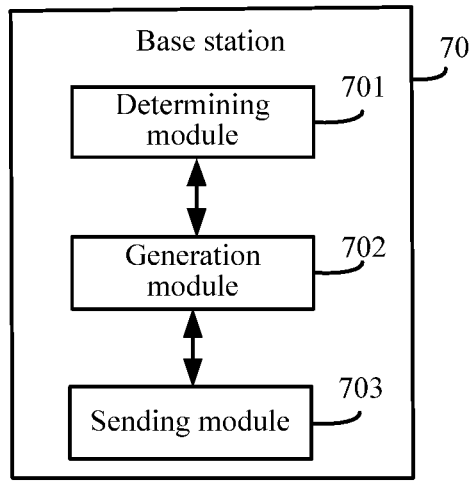
FIG. 7 is a first schematic structural diagram of a base station according to an embodiment of this application.

For example, when functional modules are divided correspondingly to functions, FIG. 7 is a possible schematic structural diagram of a base station 70 in the foregoing embodiment. As shown in FIG. 7, the base station includes: a determining module 701, a generation module 702, and a sending module 703. The determining module 701 is configured to support the base station 70 in performing operation S301 shown in FIG. 3; the generation module 702 is configured to support the base station 70 in performing operation S303 shown in FIG. 3; and the sending module 703 is configured to support the base station 70 in performing operations S302 and S304 shown in FIG. 3.

All related content of each operation in the foregoing method embodiments may be cited in function descriptions of a corresponding functional module. Details are not described herein.

Figure 8:
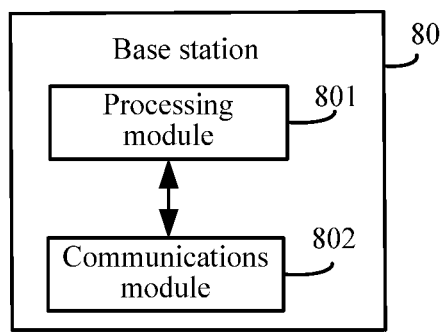
FIG. 8 is a second schematic structural diagram of a base station according to an embodiment of this application.

When functional modules are divided in an integrated manner, FIG. 8 is a possible schematic structural diagram of a base station 80 in the foregoing embodiment. As shown in FIG. 8, the base station includes: a processing module 801 and a communications module 802. The processing module 801 is configured to support the base station 80 in performing operations S301 and S303 shown in FIG. 3; and the communications module 802 is configured to support the base station 80 in performing operations S302 and S304 shown in FIG. 3.

All related content of each operation in the foregoing method embodiments may be cited in function descriptions of a corresponding functional module. Details are not described herein.

In this embodiment, the base station is presented in a form of dividing the functional modules corresponding to the functions, or the base station is presented in a form of dividing the functional modules in an integrated manner. The "module" herein may be an Application-Specific Integrated Circuit (ASIC), a circuit, a processor and a memory that execute one or more software programs or firmware programs, an integrated logic circuit, and/or another component that can provide the foregoing function. In a simple embodiment, a person skilled in the art may conceive that the form shown in FIG. 2 may be used for the base station 70 or the base station 80. For example, the determining module 701, the generation module 702, and the sending module 703 in FIG. 7 may be implemented through the processor 201 and the memory 203 in FIG. 2. In one embodiment, the determining module 701, the generation module 702, and the sending module 703 may be performed by the processor 201 by invoking the application program code stored in the memory 203. This is not limited in this embodiment of this application. Alternatively, for example, the processing module 801 and the communications module 802 in FIG. 8 may be implemented through the processor 201 and the memory 203 in FIG. 2. In one embodiment, the processing module 801 and the communications module 802 may be performed by the processor 201 by invoking the application program code stored in the memory 203. This is not limited in this embodiment of this application.

The base station provided in this embodiment of this application may be used to execute the foregoing information indication method. Therefore, for technical effects that can be achieved by the base station, refer to the foregoing method embodiments, and details are not described in this application again.

Figure 9:
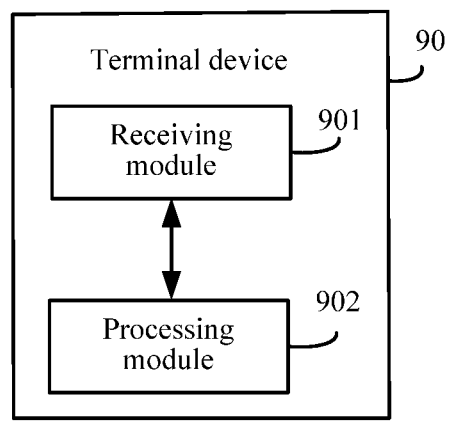
FIG. 9 is a first schematic structural diagram of a terminal device according to an embodiment of this application.

For example, when functional modules are divided corresponding to functions, FIG. 9 is a possible schematic structural diagram of a terminal device 90 in the foregoing embodiment. As shown in FIG. 9, the terminal device 90 includes: a receiving module 901 and a processing module 902. The receiving module 901 is configured to support the terminal device 90 in performing operations S305 and S306 shown in FIG. 3; and the processing module 902 is configured to support the terminal device 90 in performing subsequent processing based on the received first reference signal and/or second reference signal. For details, refer to specific functions of the first reference signal and/or the second reference signal. Details are not described herein.

All related content of each operation in the foregoing method embodiments may be cited in function descriptions of a corresponding functional module. Details are not described herein.

Figure 10:
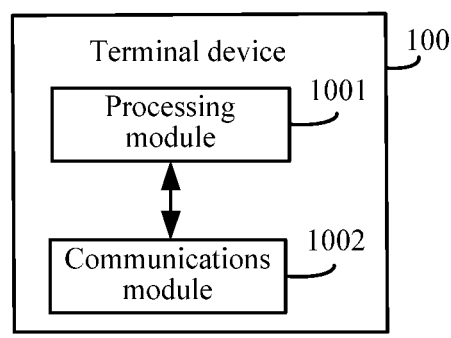
FIG. 10 is a second schematic structural diagram of a terminal device according to an embodiment of this application.

When functional modules are divided in an integrated manner, FIG. 10 is a possible schematic structural diagram of a terminal device 100 in the foregoing embodiment. As shown in FIG. 10, the terminal device 100 includes: a processing module 1001 and a communications module 1002. The communications module 1002 is configured to support the terminal device 100 in performing operations S305 and S306; and the processing module 1001 is configured to support the terminal device 100 in performing subsequent processing based on the received first reference signal and/or second reference signal. For details, refer to specific functions of the first reference signal and/or the second reference signal. Details are not described herein.

All related content of each operation in the foregoing method embodiments may be cited in function descriptions of a corresponding functional module. Details are not described herein.

In this embodiment, the terminal device is presented in a form in which functional modules are divided according to functions, or the terminal device is presented in a form in which functional modules are divided in an integrated manner. The "module" herein may be an Application-Specific Integrated Circuit (ASIC), a circuit, a processor and a memory that execute one or more software programs or firmware programs, an integrated logic circuit, and/or another component that can provide the foregoing function. In a simple embodiment, a person skilled in the art may conceive that the form shown in FIG. 2 may be used for the terminal device 90 or the terminal device 100. For example, the receiving module 901 and the processing module 902 in FIG. 9 may be implemented through the processor 201 and the memory 203 in FIG. 2. In one embodiment, the receiving module 901 and the processing module 902 may be performed by the processor 201 by invoking the application program code stored in the memory 203. This is not limited in this embodiment of this application. Alternatively, for example, the processing module 1001 and the communications module 1002 in FIG. 10 may be implemented through the processor 201 and the memory 203 in FIG. 2. In one embodiment, the processing module 1001 and the communications module 1002 may be performed by the processor 201 by invoking the application program code stored in the memory 203. This is not limited in this embodiment of this application.

The terminal device provided in this embodiment of this application may be used to execute the foregoing information indication method. Therefore, for technical effects that can be achieved by the terminal device, refer to the foregoing method embodiments, and details are not described in this application again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a Digital Subscriber Line (DSL)) or wireless (for example, infrared, radio, and microwave, or the like) manner. The computer-readable storage medium may be any available medium accessible by a computer, or a data storage device, such as a server or a data center, integrating one or more available media. The usable medium may be a magnetic medium (for example, a floppy disk, a hard disk, or a magnetic tape), an optical medium (for example, a DVD), a semiconductor medium (for example, a Solid State Disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the word "comprise" (comprising) does not exclude another component or operation, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and accompanying drawings are merely examples of descriptions of this application defined by the appended claims, and is considered as any of or all modifications, variations, combinations or equivalents that cover the scope of this application. Evidently, a person skilled in the art can make various modifications and variations to this application without departing from the scope of this application. This application is intended to cover these modifications and variations of this application provided that they fall within the scope of protection defined by the following claims and their equivalent technologies.

The invention claimed is:

1. An information indication method, comprising:
    determining, by a base station, that a first port used to transmit a first reference signal and a second port used to transmit a second reference signal are multiplexed;
    sending, by the base station, at least one of the first reference signal or the second reference signal on a multiplexed port, the multiplexed port being one of the first port or the second port; generating, by the base station, information indicating a multiplexing type of the multiplexed port, the multiplexing type indicating which of the first port or the second port is multiplexed for the other port; and
    sending the information indicating the multiplexing type of the multiplexed port.

2. The method according to claim 1, wherein the information indicating the multiplexing type of the multiplexed port comprises:
    a first identifier used to indicate the multiplexing type of the multiplexed port.

3. The method according to claim 2, wherein when the first identifier is set to a first value, the second port used to transmit the second reference signal is multiplexed for the first port, and the information indicating the multiplexing type of the multiplexed port further comprises:
    a second identifier used to indicate a resource configuration index of the first reference signal; and
    a third identifier used to indicate an index of the multiplexed port used to transmit the first reference signal.

4. The method according to claim 2, wherein when the first identifier is set to a second value, the first port used to transmit the first reference signal is multiplexed for the second port, and the information indicating the multiplexing type of the multiplexed port further comprises:
    a fourth identifier used to indicate a resource configuration index of the second reference signal; and
    a fifth identifier—used to indicate an index of the multiplexed port used to transmit the second reference signal.

5. The method according to claim 2, wherein the information indicating the multiplexing type of the multiplexed port further comprises:
    a sixth identifier used to indicate an index of a subframe in which the multiplexed port is located.

6. The method according to claim 2, wherein the information indicating the multiplexing type of the multiplexed port further comprises:
    a seventh identifier used to indicate an index of an orthogonal frequency division modulation (OFDM) symbol on which the multiplexed port is located.

7. A base station, comprising: a processor, a memory, a bus, and a communications interface, wherein
    the memory is to store computer executable instructions, the processor is connected to the memory by using the bus, and when the base station is operational, the processor executes the computer executable instructions stored in the memory, to enable the base station to:
    determine that a first port used to transmit a first reference signal and a second port used to transmit a second reference signal are multiplexed;
    send at least one of the first reference signal or the second reference signal on a multiplexed port, the multiplexed port being one of the first port or the second port;
    generate information indicating a multiplexing type of the multiplexed port, the multiplexing type indicating which of the first port or the second port is multiplexed for the other port; and
    send the information indicating the multiplexing type of the multiplexed port.

8. The base station according to claim 7, wherein the information indicating the multiplexing type of the multiplexed port comprises:
    a first identifier used to indicate the multiplexing type of the multiplexed port.

9. The base station according to claim 8, wherein when the first identifier is set to a first value, the second port used to transmit the second reference signal is multiplexed for the first port, and the information indicating the multiplexing type of the multiplexed port further comprises:
    a second identifier used to indicate a resource configuration index of the first reference signal; and
    a third identifier used to indicate an index of the multiplexed port used to transmit the first reference signal.

10. The base station according to claim 8, wherein when the first identifier is set to a second value, the first port used to transmit the first reference signal is multiplexed for the second port, and the information indicating the multiplexing type of the multiplexed port further comprises:
    a fourth identifier used to indicate a resource configuration index of the second reference signal; and
    a fifth identifier—used to indicate an index of the multiplexed port used to transmit the second reference signal.

11. The base station according to claim 8, wherein the information indicating the multiplexing type of the multiplexed port further comprises:
    a sixth identifier used to indicate an index of a subframe in which the multiplexed port is located.

12. The base station according to claim 8, wherein the information indicating the multiplexing type of the multiplexed port further comprises:
    a seventh identifier used to indicate an index of an orthogonal frequency division modulation (OFDM) symbol on which the multiplexed port is located.

13. The base station according to claim 7, wherein the sending the information indicating the multiplexing type of the multiplexed port comprises:
    sending the information indicating the multiplexing type through a physical downlink dedicated control channel (PDCCH) or a physical downlink shared channel (PDSCH).

14. A terminal device, comprising: a processor, a memory, a bus, and a communications interface, wherein
    the memory is to store computer executable instructions, the processor is connected to the memory by using the bus, and when the terminal device is operational, the processor executes the computer executable instructions stored in the memory, to enable the terminal device to:
    receive information indicating multiplexing type of a multiplexed port, the multiplexed port being one of a first port or a second port, the multiplexing type indicating which of the first port or the second port is multiplexed for the other port, the first port used to transmit a first reference signal and the second port used to transmit a second reference signal; and
    receive at least one of the first reference signal or the second reference signal on the multiplexed port according to the information indicating the multiplexing type of the multiplexed port.

15. The terminal device according to claim 14, wherein the information indicating the multiplexing type of the multiplexed port comprises:
   a first identifier used to indicate the multiplexing type of the multiplexed port.

16. The terminal device according to claim 15, wherein when the first identifier is set to a first value, the second port used to transmit the second reference signal is multiplexed for the first port, and the information indicating the multiplexing type of the multiplexed port further comprises:
   a second identifier used to indicate a resource configuration index of the first reference signal; and
   a third identifier used to indicate an index of the multiplexed port used to transmit the first reference signal.

17. The terminal device according to claim 15, wherein when the first identifier is set to a second value, the first port used to transmit the first reference signal is multiplexed for the second port, and the information indicating multiplexing type of the multiplexed port further comprises:
   a fourth identifier used to indicate a resource configuration index of the second reference signal; and
   a fifth identifier—used to indicate an index of the multiplexed port used to transmit the second reference signal.

18. The terminal device according to claim 15, wherein the information indicating the multiplexing type of the multiplexed port further comprises:
   a sixth identifier used to indicate an index of a subframe in which the multiplexed port is located.

19. The terminal device according to claim 15, wherein the information indicating the multiplexing type of the multiplexed port further comprises:
   a seventh identifier used to indicate an index of an orthogonal frequency division modulation (OFDM) symbol on which the multiplexed port is located.

20. The terminal device according to claim 14, wherein the receiving information indicating the multiplexing type of the multiplexed port comprises:
   receiving the information indicating the multiplexing type of the multiplexed port through a physical downlink dedicated control channel (PDCCH) or a physical downlink shared channel (PDSCH).

* * * * *